United States Patent
Hirau et al.

(10) Patent No.: US 8,563,654 B2
(45) Date of Patent: *Oct. 22, 2013

(54) GOLF BALL

(75) Inventors: Tsutomu Hirau, Kobe (JP); Toshiyuki Tarao, Kobe (JP)

(73) Assignee: SRI Sports Limited, Kobe (JP)

( * ) Notice: Subject to any disclaimer, the term of this patent is extended or adjusted under 35 U.S.C. 154(b) by 467 days.

This patent is subject to a terminal disclaimer.

(21) Appl. No.: 12/289,956

(22) Filed: Nov. 7, 2008

(65) Prior Publication Data

US 2009/0124430 A1 May 14, 2009

(30) Foreign Application Priority Data

Nov. 8, 2007 (JP) ................................ 2007-291125

(51) Int. Cl.
*A63B 37/12* (2006.01)
*A63B 37/00* (2006.01)
*C08L 75/04* (2006.01)

(52) U.S. Cl.
USPC ...... 525/129; 525/127; 525/130; 525/440.01; 525/440.11; 525/440.12; 525/457; 525/458; 473/378

(58) Field of Classification Search
None
See application file for complete search history.

(56) References Cited

U.S. PATENT DOCUMENTS

| | | | |
|---|---|---|---|
| 3,395,109 A | 7/1968 | Molitor et al. | |
| 3,989,568 A | 11/1976 | Isaac | |
| 4,123,061 A | 10/1978 | Dusbiber | |
| 4,248,432 A | 2/1981 | Hewitt et al. | |
| 4,347,338 A * | 8/1982 | Torii et al. ................. | 525/123 |
| 5,334,673 A | 8/1994 | Wu | |
| 5,553,852 A | 9/1996 | Higuchi et al. | |
| 5,947,844 A | 9/1999 | Shimosaka et al. | |
| 6,123,534 A | 9/2000 | Kasashima et al. | |
| 6,123,628 A | 9/2000 | Ichikawa et al. | |
| 6,258,310 B1 * | 7/2001 | Sardanopoli et al. ...... | 264/211.23 |
| 6,346,053 B1 | 2/2002 | Inoue et al. | |
| 6,660,824 B2 | 12/2003 | Yokota | |
| 6,685,456 B2 | 2/2004 | Sajima | |
| 6,686,436 B2 | 2/2004 | Iwami | |
| 6,747,100 B2 | 6/2004 | Ichikawa et al. | |
| 6,764,415 B2 | 7/2004 | Ichikawa et al. | |
| 6,806,323 B2 | 10/2004 | Ichikawa et al. | |
| 6,887,168 B2 | 5/2005 | Hayashi et al. | |
| 6,966,850 B2 | 11/2005 | Watanabe et al. | |
| 6,992,145 B2 * | 1/2006 | Ichikawa et al. ........... | 525/330.1 |
| 7,052,415 B2 | 5/2006 | Sasaki et al. | |
| 7,090,799 B2 | 8/2006 | Takesue et al. | |
| 7,322,892 B1 | 1/2008 | Watanabe | |
| 7,335,115 B1 | 2/2008 | Watanabe et al. | |
| 7,344,454 B2 | 3/2008 | Umezawa et al. | |
| 8,017,690 B2 * | 9/2011 | Hirau et al. .................. | 525/129 |
| 2002/0094886 A1 | 7/2002 | Sajima | |
| 2003/0064831 A1 | 4/2003 | Ichikawa et al. | |
| 2003/0064832 A1 | 4/2003 | Ichikawa et al. | |
| 2004/0106473 A1 | 6/2004 | Hayashi et al. | |
| 2005/0187038 A1 | 8/2005 | Sasaki et al. | |
| 2006/0270492 A1 | 11/2006 | Higuchi et al. | |
| 2007/0129174 A1 * | 6/2007 | Higuchi ....................... | 473/373 |
| 2007/0142127 A1 * | 6/2007 | Tarao ........................... | 473/371 |
| 2008/0161134 A1 | 7/2008 | Tarao | |
| 2009/0111608 A1 | 4/2009 | Watanabe et al. | |
| 2009/0124420 A1 | 5/2009 | Kamino et al. | |
| 2009/0124421 A1 * | 5/2009 | Hirau et al. .................. | 473/374 |
| 2009/0124430 A1 | 5/2009 | Hirau et al. | |
| 2009/0221387 A1 | 9/2009 | Ohama et al. | |
| 2009/0247326 A1 | 10/2009 | Ohama et al. | |
| 2009/0247328 A1 | 10/2009 | Kamino et al. | |

FOREIGN PATENT DOCUMENTS

| | | | |
|---|---|---|---|
| JP | 51-74726 | A | 6/1976 |
| JP | 58-2063 | B2 | 1/1983 |
| JP | 7-24085 | A | 1/1995 |
| JP | 2662909 | B2 | 6/1997 |
| JP | 9-215778 | A | 8/1997 |
| JP | 10-99469 | A | 4/1998 |
| JP | 11-89967 | A | 4/1999 |
| JP | 11-137727 | A | 5/1999 |
| JP | 11-178949 | A | 7/1999 |
| JP | 2002-159598 | A | 6/2002 |
| JP | 2002-200196 | A | 7/2002 |
| JP | 2002-263219 | A | 9/2002 |
| JP | 2002-336378 | A | 11/2002 |
| JP | 2002-336380 | A | 11/2002 |
| JP | 2002-336386 | A | 11/2002 |
| JP | 2003/000764 | A | 1/2003 |

(Continued)

OTHER PUBLICATIONS

Thomson; Polyurethanes as Specialty Chemicals CRC Press (2005); pp. 1-7 of Chapter 2.*
Fuest; Polyurethane Elastomers; Rubber Technology: Compounding and Testing for Performance (2001) chaper 9.*
Japanese Office Action with the English translation dated Nov. 8, 2011, for Application No. 2007-190111.
Japanese Office Action with the English translation dated Nov. 8, 2011, for Application No. 2007-190112.
Japanese Office Action with the English translation dated Nov. 8, 2011, for Application No. 2007-291125.
Office Action dated May 7, 2012 that issued in related U.S. Appl. No. 12/003,598.

(Continued)

*Primary Examiner* — David Buttner
(74) *Attorney, Agent, or Firm* — Birch, Stewart, Kolasch & Birch, LLP

(57) ABSTRACT

An object of the present invention is to provide a golf ball comprising a core and a cover, wherein the cover is made from a cover composition containing, as a resin component, a thermoplastic polyurethane (A) and a polyisocyanate mixture (B) in which a urethane prepolymer (b-1) having at least two isocyanate groups is dispersed in a thermoplastic resin (b-2) which does not substantially react with an isocyanate group; and wherein the cover composition has a slab hardness of more than 60 and not more than 75, and the cover has a thickness of 2.5 mm or less.

13 Claims, 3 Drawing Sheets

(56) References Cited

FOREIGN PATENT DOCUMENTS

| | | |
|---|---|---|
| JP | 2003-070936 A | 3/2003 |
| JP | 2004-16583 A | 1/2004 |
| JP | 2004-97581 A | 4/2004 |
| JP | 2004-180793 A | 7/2004 |
| JP | 2004-305755 A | 11/2004 |
| JP | 2005-224514 A | 8/2005 |
| JP | 2005-230375 A | 9/2005 |
| JP | 2005-253962 A | 9/2005 |
| JP | 2006-344 A | 1/2006 |
| JP | 2007-159997 A | 6/2007 |
| JP | 2009-201896 A | 9/2009 |
| JP | 2009-226115 A | 10/2009 |
| KE | 2000-279553 A | 10/2000 |

OTHER PUBLICATIONS

Japanese Decision of Rejection with the English translation dated Aug. 21, 2012, for Application No. 2007-291125.

US Office Action, dated Jun. 12, 2012, for U.S. Appl. No. 12/289,953.

* cited by examiner

GOLF BALL

FIELD OF THE INVENTION

The present invention relates to a golf ball, and more particularly to a technique of improving the abrasion resistance and durability as well as providing a long flight distance of a golf ball having a urethane cover.

DESCRIPTION OF THE RELATED ART

As a base resin constituting a cover of a golf ball, an ionomer resin or polyurethane is conventionally used. Covers containing ionomer resins are widely used for their excellent resilience, durability, workability and the like. However, because of their high rigidity and hardness, problems such as bad shot feeling, inadequate spin performance and poor controllability are pointed out. On the other hand, the polyurethane is used as a base resin constituting the cover since it provides an improved shot feeling and spin properties compared with an ionomer resin. For example, Japanese Patent Publication No. H09-215778 A discloses a two-piece solid golf ball using a thermoplastic polyurethane for the cover. However, the golf ball using a thermoplastic polyurethane for the cover is insufficient in the abrasion resistance and durability.

Japanese Patent Publication Nos. 2003-764 A and 2003-70936 A disclose techniques of improving the abrasion resistance and durability of covers using thermoplastic polyurethanes. These publications disclose golf balls having covers formed from compositions containing thermoplastic polyurethane materials and isocyanate mixtures obtained by dispersing an isocyanate compound having two or more isocyanate groups as a functional group in one molecule in a thermoplastic resin substantially non-reactive with an isocyanate group.

SUMMARY OF THE INVENTION

However, in the case the cover hardness is high, if a polyisocyanate with a low molecular weight is used as disclosed in Japanese Patent publications Nos. 2003-764 A and 2003-70936 A, because of the crosslinking, the cover becomes so hard as to result in problems such that the effect of improving the abrasion resistance and durability is rather diminished.

The present invention has been made in view of the above-mentioned circumstances and the object of the present invention is to provide a golf ball having a urethane cover with high hardness that is excellent in the abrasion resistance, durability and flight performance.

The present invention, which has solved the above problem, provides a golf ball comprising a core and a cover covering the core, wherein the cover is made from a cover composition containing, as a resin component, a thermoplastic polyurethane (A) and a polyisocyanate mixture (B) in which a urethane prepolymer (b-1) having at least two isocyanate groups is dispersed in a thermoplastic resin (b-2) which does not substantially react with an isocyanate group; and wherein the cover composition has a slab hardness of more than 60 and not more than 75 in Shore D hardness, and the cover has a thickness of 2.5 mm or less.

That is, in the invention, since the thermoplastic polyurethane (A) is crosslinked by the polyisocyanate mixture (B) obtained by dispersing a urethane prepolymer (b-1) having a high molecular weight as compared with a low molecular weight polyisocyanate compound in a thermoplastic resin (b-2) which is not substantially reactive with an isocyanate group, the cover to be obtained does not become too hard and the effect of improving the abrasion resistance and durability becomes significant. Further, since the slab hardness of the cover composition is controlled so high as to exceed 60 and 75 or lower in Shore D hardness, the repulsion property of the golf ball can be improved and excess spin rate at the time of shot can be suppressed and accordingly, a long flight distance can be achieved. Further, since the thickness of the cover is set to 2.5 mm or thinner, the core can be made to have a large diameter and the repulsion property of the golf ball can be increased. Accordingly, a long flight distance can be achieved.

The isocyanate content (NCO %) of the above-mentioned polyisocyanate mixture (B) is preferably 0.1% or more and 10.0% or less by mass. Further, the isocyanate content (NCO %) of the urethane prepolymer (b-1) is preferably 0.5% or more and 15.0% or less by mass.

As the above-mentioned urethane prepolymer (b-1), for example, bifunctional isocyanate group-terminated urethane prepolymer represented by the following formula (1) can be preferably used.

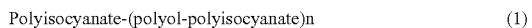

Polyisocyanate-(polyol-polyisocyanate)n    (1)

In the formula (1), the connecting number n denotes an integer of not less than 1 and not higher than 10.

The number average molecular weight of the polyol component constituting the urethane prepolymer (b-1) is preferably 650 or higher. If the number average molecular weight of the polyol component is 650 or higher, the distance between crosslinking points at the time of the crosslinking reaction is widened and the abrasion resistance and durability can be further improved without making the resultant polyurethane cover too hard.

The above-mentioned thermoplastic resin (b-2) which is not substantially reactive with an isocyanate group is preferably at least one selected from the group consisting of a polyester elastomer, an acrylic elastomer, a styrene elastomer, an olefin elastomer, and a vinyl chloride elastomer.

The above-mentioned cover composition preferably contains the polyisocyanate mixture (B) in an amount of 1 part to 50 parts with respect to 100 parts of the thermoplastic polyurethane (A) by mass. If the content of the polyisocyanate mixture (B) is out of the above-mentioned range, a sufficient crosslinked structure may not be obtained or the crosslinking density may possibly become too high, which results in a possibility to deteriorate durability.

The mixing ratio (100% by weight in total) of the urethane prepolymer (b-1) and the thermoplastic resin (b-2) in the polyisocyanate mixture (B) is preferably urethane prepolymer (b-1)/thermoplastic resin (b-2)=(5% to 50% by mass)/(50% by to 95% by mass). If the mixing ratio of the urethane prepolymer (b-1) and the thermoplastic resin (b-2) is out of the range, desired crosslinked structure may not be obtained or the crosslinking density may become too high, which results in a possibility to deteriorate durability.

According to the present invention, a golf ball excellent in the abrasion resistance, durability, and flight performance can be provided.

DESCRIPTION OF THE PREFERRED EMBODIMENT

Figure 1:
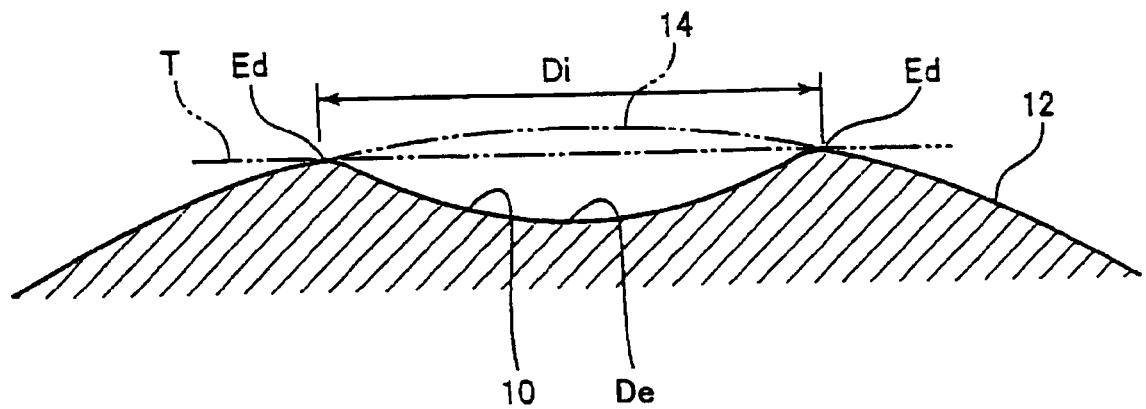
FIG. 1 is an expanded cross sectional view of a dimple formed on a golf ball surface.

The present invention provides a golf ball comprising a core and a cover covering the core, wherein the cover is made from a cover composition containing, as a resin component, a thermoplastic polyurethane (A) and a polyisocyanate mixture (B) in which a urethane prepolymer (b-1) having at least two isocyanate groups is dispersed in a thermoplastic resin (b-2) which does not substantially react with an isocyanate group; and wherein the cover composition has a slab hardness of more than 60 and not more than 75 in Shore D hardness, and the cover has a thickness of 2.5 mm or less. Hereinafter, the present invention will be described in detail.

The cover of the golf ball of the present invention will be described. The cover of the golf ball of the invention is characterized in that the cover is formed from a cover composition containing, as resin components, the thermoplastic polyurethane (A) and the polyisocyanate mixture (B) obtained by dispersing a urethane prepolymer (b-1) having at least two isocyanate groups in a thermoplastic resin (b-2) which is not substantially reactive with an isocyanate group and the slab hardness of the cover composition is more than 60 and not more than 75 in Shore D hardness.

First, the thermoplastic polyurethane (A) will be explained. The thermoplastic polyurethane (A) used in the present invention is not particularly limited as long as it has a plurality of urethane bonds in a molecule and exhibits thermoplasticity. For example, the thermoplastic polyurethane is a reaction product obtained by reacting a polyisocyanate with a polyol to form urethane bonds in a molecule thereof, where necessary, obtained by further carrying out a chain extension reaction with a polyol, a polyamine or the like having a low-molecular weight.

The polyisocyanate component, which constitutes the thermoplastic polyurethane (A) is not limited as long as it has at least two isocyanate groups. Examples of the polyisocyanate include an aromatic polyisocyanate such as 2,4-tolylene diisocyanate, 2,6-tolylene diisocyanate, a mixture of 2,4-tolylene diisocyanate and 2,6-tolylene diisocyanate (TDI), 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylene-diisocyanate (TMXDI), para-phenylene diisocyanate (PPDI); an alicyclic polyisocyanate or aliphatic polyisocyanate such as 4,4'-dicyclohexylmethane diisocyanate ($H_{12}$MDI), hydrogenated xylylenediisocyanate ($H_6$XDI), hexamethylene diisocyanate (HDI), isophorone diisocyanate (IPDI), and norbornene diisocyanate (NBDI). These may be used either alone or as a mixture of at least two of them.

In view of improving the abrasion-resistance, the aromatic polyisocyanate is preferably used as the polyisocyanate component of the thermoplastic polyurethane (A). A use of the aromatic polyisocyanate improves the mechanical property of the obtained polyurethane and provides the cover with the excellent abrasion-resistance. In addition, in view of improving the weather resistance, as the polyisocyanate component of the thermoplastic polyurethane (A), a non-yellowing type polyisocyanate such as TMXDI, XDI, HDI, $H_6$XDI, IPDI, $H_{12}$MDI and NBDI is preferably used. More preferably, 4,4'-dicyclohexylmethane diisocyanate ($H_{12}$MDI) is used. Since 4,4'-dicyclohexylmethane diisocyanate ($H_{12}$MDI) has a rigid structure, the mechanical property of the resulting polyurethane is improved, and thus the cover which is excellent in abrasion-resistance can be obtained.

The polyol component constituting the thermoplastic polyurethane (A) is not particularly limited as long as it has a plurality of hydroxyl groups, and such examples include a low-molecular weight polyol and a high-molecular weight polyol. Examples of the low-molecular weight polyol may include a diol such as ethylene glycol, diethylene glycol, triethylene glycol, propanediol (e.g., 1,2-propanediol, 1,3-propanediol, and 2-methyl-1,3-propanediol), dipropylene glycol, butanediol (e.g., 1,2-butanediol, 1,3-butanediol, 1,4-butanediol, 2,3-butanediol, and 2,3-dimethyl-2,3-butanediol), neopentyl glycol, pentanediol, hexanediol, heptanediol, octanediol, 1,6-cyclohexanedimethylol, an aniline diol, and bisphenol A diol; a triol such as glycerin, trimethylol propane, and hexanetriol; a tetraol or a hexanol such as pentaerythritol and sorbitol. Examples of the high-molecular weight polyol include a polyether polyol such as polyoxyethylene glycol (PEG), polyoxypropylene glycol (PPG), and polyoxytetramethylene glycol; a condensed polyester polyol such as polyethylene adipate (PEA), polybutylene adipate (PBA), and polyhexamethylene adipate (PHMA); a lactone polyester polyol such as poly-ε-caprolactone (PCL); a polycarbonate polyol such as polyhexamethylene carbonate; and an acrylic polyol. The above polyols may be used alone or as a mixture of at least two of them.

A number average molecular weight of the high-molecular weight polyol is not particularly limited, and for example, it is preferably 400 or more, more preferably 1,000 or more. If the number average molecular weight of the high-molecular weight polyol is too small, the resultant polyurethane becomes too hard and the shot feeling of the golf ball is lowered. The upper limit of the number average molecular weight of the high molecular weight polyol is not particularly limited, and it is preferably 10,000, more preferably 8,000.

The polyamine component that constitutes the thermoplastic polyurethane where necessary may include any polyamine, as long as it has at least two amino groups. The polyamine includes an aliphatic polyamine such as ethylene-diamine, propylenediamine, butylenediamine, and hexamethylenediamine, an alicyclic polyamine such as isophoronediamine, piperazine, and an aromatic polyamine.

The aromatic polyamine has no limitation as long as it has at least two amino groups directly or indirectly bonded to an aromatic ring. Herein, the "indirectly bonded to the aromatic ring", for example, means that the amino group is bonded to the aromatic ring via a lower alkylene bond. Further, the aromatic polyamine includes, for example, a monocyclic aromatic polyamine having at least two amino groups bonded to one aromatic ring or a polycyclic aromatic polyamine having at least two aminophenyl groups each having at least one amino group bonded to one aromatic ring.

Examples of the monocyclic aromatic polyamine include a type such as phenylenediamine, tolylenediamine, diethyl-toluenediamine, and dimethylthiotoluenediamine wherein amino groups are directly bonded to an aromatic ring; and a type such as xylylenediamine wherein amino groups are bonded to an aromatic ring via a lower alkylene group. Further, the polycyclic aromatic polyamine may include a poly (aminobenzene) having at least two aminophenyl groups directly bonded to each other or a compound having at least two aminophenyl groups bonded via a lower alkylene group or an alkylene oxide group. Among them, a diaminodiphenyl-alkane having two aminophenyl groups bonded to each other via a lower alkylene group is preferable. Typically preferred are 4,4'-diaminodiphenylmethane or the derivatives thereof.

The thermoplastic polyurethane (A) has no limitation on the constitutional embodiments thereof. Examples of the constitutional embodiments are the embodiment where the polyurethane consists of the polyisocyanate component and the high-molecular weight polyol component; the embodiment where the polyurethane consists of the polyisocyanate component, the high-molecular weight polyol component and the low-molecular weight polyol component; and the embodiment where the polyurethane consists of the polyisocyanate component, the high-molecular weight polyol component, the low-molecular weight polyol component, and the polyamine component; and the embodiment where the polyurethane consists of the polyisocyanate component, the high-molecular weight polyol component and the polyamine component.

The thermoplastic polyurethane (A) preferably has a slab hardness of 55 or more, more preferably 60 or more, and preferably has a slab hardness of 75 or less, more preferably 70 or less in Shore D hardness. If the slab hardness of the cover is too low, the flight distance of the golf ball may be lowered, due to the low repulsion of the resultant cover. On the other hand, if the slab hardness of the cover is too high, the abrasion resistance and the durability may be lowered. Specific examples of the thermoplastic polyurethane (A) include "Elastollan ET858D, ET864D, 1174D, HM76D."

Next, the polyisocyanate mixture (B) in which the urethane prepolymer (b-1) having at least two isocyanate groups is dispersed in the thermoplastic resin (b-2) which does not substantially react with an isocyanate group will be explained.

The urethane prepolymer (b-1) is not particularly limited as long as it is a compound having a plurality of urethane bonds in a molecule thereof and two or more isocyanate groups, and having lower molecular weight than that of the thermoplastic polyurethane (A). Such examples include an isocyanate group-terminated urethane prepolymer having urethane bonds formed in a molecule thereof by, for example, reacting a polyisocyanate and a polyol under a condition wherein the polyisocyanate is in excess. The blending ratio of the polyisocyanate component to the polyol component is preferably 1.1 or more, more preferably 1.2 or more, even more preferably 1.3 or more, and is preferably 3.0 or less, more preferably 2.5 or less, even more preferably 2.0 or less in a molar ratio (NCO/OH) of the isocyanate group (NCO) of the polyisocyanate component to the hydroxyl group (OH) of the polyol component.

The polyisocyanate component used as a raw material for the urethane prepolymer (b-1) is not limited, as long as the polyisocyanate has at least two isocyanate groups. Examples of the polyisocyanate component include polyisocyanates exemplified as the polyisocyanate constituting the thermoplastic polyurethane (A). The polyol component used as a raw material for the urethane prepolymer (b-1) is not limited, as long as the polyol component has a plurality of hydroxyl groups. Examples of the polyol component include polyols such as a high-molecular weight polyol and a low-molecular weight polyol exemplified as the polyol component constituting the thermoplastic polyurethane (A).

The isocyanate group-terminated urethane prepolymer used as the urethane prepolymer (b-1) includes TDI based urethane prepolymer, MDI based urethane prepolymer, and $H_{12}$MDI based urethane prepolymer. Preferably used is MDI based urethane prepolymer or $H_{12}$MDI urethane prepolymer. Herein, TDI based urethane prepolymer means an isocyanate group terminated urethane prepolymer obtained by reacting TDI or a polyisocyanate compound containing TDI as a main component with a polyol (preferably PTMG); MDI based urethane prepolymer means an isocyanate group terminated urethane prepolymer obtained by reacting MDI or a polyisocyanate compound containing MDI as a main component with a polyol (preferably PTMG), and $H_{12}$MDI urethane prepolymer means an isocyanate group terminated urethane prepolymer obtained by reacting $H_{12}$MDI or a polyisocyanate compound containing $H_{12}$MDI with a polyol (preferably PTMG).

For a reaction between the polyisocyanate component and the polyol component, a catalyst which is publicly known for being used in the urethane reaction can be used. Examples of the catalyst include a monoamine such as triethylamine and N,N-dimethylcyclohexylamine; a polyamine such as N,N,N', N'-tetramethylethylenediamine and N,N,N',N'',N''-pentamethyldiethylenetriamine; a cyclic diamine such as 1,8-diazabicyclo[5,4,0]-7-undecene (DBU) and triethylenediamine; a tin catalyst such as dibutyltin dilaurylate and dibutyltin diacetate; an organic carboxylic acid such as acetic acid, azelaic acid, oleic acid and adipic acid.

The urethane prepolymer (b-1) preferably has NCO content (NCO %) of 0.5 mass % or more, more preferably 0.75 mass % or more, even more preferably 1.0 mass % or more, and preferably has NCO content (NCO %) of 15.0 mass % or less, more preferably 12.0 mass % or less, even more preferably 9.0 mass % or less, even more preferably 6.0 mass % or less. If the urethane prepolymer (b-1) has too low NCO content, the effect of the crosslinking may be little and the abrasion-resistance may also become worse, while if the urethane prepolymer has too high NCO content, the viscosity of the cover composition may increase to excess, resulting in lowering the moldability.

NCO content (NCO %) of the urethane prepolymer (b-1) is defined as 100×[number of moles of the isocyanate group in the urethane prepolymer (b-1)×42 (molecular weight of NCO)]/[total amount (g) of the urethane prepolymer (b-1)]

A number average molecular weight of the urethane prepolymer (b-1) is preferably, for example, 1000 or more, more preferably 1500 or more, even more preferably 2000 or more, and is preferably 30000 or less, more preferably 20000 or less, even more preferably 10000 or less. If the number average molecular weight is 1000 or more, a distance between crosslinking points at a time of crosslinking reaction becomes longer, so that the resultant polyurethane cover does not become too hard, thereby improving durability thereof. On the other hand, if the number average molecular weight is more than 30000, crosslinking density becomes low, so that abrasion-resistance of the resultant cover may be lowered.

The polyisocyanate component and the polyol component constituting the urethane prepolymer may be suitably selected from the components described above as the components constituting the thermoplastic polyurethane (A).

The number average molecular weight of the polyol component constituting the urethane prepolymer (b-1) is preferably 650 or more, more preferably 700 or more, even more preferably 800 or more, and preferably 10,000 or less, more preferably 5,000 or less, even more preferably 3,000 or less. If the number average molecular weight is 650 or more, a distance between crosslinking points at a time of crosslinking reaction becomes longer, so that the resultant polyurethane cover does not become too hard, and the durability thereof is improved. On the other hand, if the number average molecular weight is more than 10,000, crosslinking density becomes low, so that the abrasion-resistance of the resultant cover may be lowered. The number average molecular weight of the urethane prepolymer (b-1) or the polyol component can be measured by Gel permeation Chromatography using two columns of TSK-GEL SUPREH 2500 (TOSOH Corporation) as a column, polystyrene as a standard material, and tetrahydrofuran as an eluate.

The functional number of the isocyanate group of the urethane prepolymer (b-1) used in the present invention is not particularly limited as long as it is at least two, and may be, for example, trifunctional or tetrafunctional. A polyfunctional urethane prepolymer which is at least trifunctional can be obtained by using at least a trifunctional polyol or polyisocyanate as the ones constituting the urethane prepolymer.

Examples of the trifunctional or more than trifunctional polyisocyanate include a trifunctional isocyanate such as polymeric MDI, triphenyl methane triisocyanate, tris(isocyanate phenyl)thiophosphate, lysin ester triisocyanate, 1,6,11-undecane triisocyanate, 1,8-diisocyanate-4-isocyanate methyloctane, 1,3,6-hexamethylene triisocyanate, and bicycloheptane triisocyanate; isocyanurate of diisocyanate; an adduct obtained by reacting diisocyanate with a triol having a low-molecular weight such as trimethylol propane or glycerin (free diisocyanate are preferably removed from the adduct); an allophanate modified polyisocyanate; a biuret modified polyisocyanate, and the like. The allophanate modified polyisocyanate is, for example, a trifunctional polyisocyanate obtained by reacting diisocyanate with a diol having a low-molecular weight to form a urethane bond and further reacting the urethane bond with the diisocyanate, and the biuret modified polyisocyanate is, for example, a trifunctional polyisocyanate obtained by reacting a diisocyanate with a diamine having a low-molecular weight to form a urea bond and further reacting the urea bond with the diisocyanate.

Among them, in the present invention, it is a preferred embodiment to use a bifunctional isocyanate group-terminated urethane prepolymer represented by the formula (1).

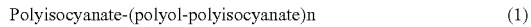

Polyisocyanate-(polyol-polyisocyanate)n     (1)

In the formula (1), a connecting number n is preferably 1 or more and 10 or less, more preferably 5 or less, even more preferably 4 or less, further preferably 3 or less. If the connecting number n is 1 or more, a distance between crosslinking points at the time of the crosslinking reaction becomes longer, so that the resultant polyurethane cover does not become too hard, and the durability thereof is improved. On the other hand, if the connecting number n is more than 10, the crosslinking density becomes low, so that the abrasion-resistance of the resultant cover may be lowered.

The thermoplastic resin (b-2) which does not substantially react with an isocyanate group is not particularly limited as long as it is substantially inactive with an isocyanate group (That is, the thermoplastic resin (b-2) does not substantially have an active hydrogen reactive with an isocyanate group), and such examples include a polystyrene resin, a polyvinylchloride resin, an acrylic resin, an ABS resin, an ester rubber, a polycarbonate resin, a polyester resin (preferably polyethylene terephthalate), polyolefin, polyacetal, a difluoride resin, a tetrafluoride resin, and an ionomer resin. Among them, as the thermoplastic resin (b-2), a thermoplastic elastomer having rubber elasticity is preferable. For example, it is preferred to use at least one kind selected from the group consisting of a polyester elastomer, an acrylic elastomer, a styrene elastomer, an olefin elastomer, and a vinyl chloride elastomer. Examples of the polyester elastomer include "HYTREL such as "HYTREL 3046", "HYTREL 3548" and "HYTREL 4047" manufactured by DU PONT-TORAY Co, and examples of the styrene elastomer include "Rabalon" manufactured by Mitsubishi Chemical Corporation.

In the polyisocyanate mixture (B), a blending ratio of the urethane prepolymer (b-1) to the thermoplastic resin (b-2) (a total of 100 mass %) is preferably: the urethane prepolymer (b-1)/thermoplastic resin (b-2)=5 mass % to 50 mass %/50 mass % to 95 mass %, more preferably 10 mass % to 50 mass %/50 mass % to 90 mass %, even more preferably 20 mass % to 45 mass %/55 mass % to 80 mass %. If the blending ratio is outside the above range, a desired crosslinked structure may not be obtained, or crosslinking density may become too high, so that durability may be undermined.

NCO content (NCO %) of the polyisocyanate mixture (B) is defined as 100×[number of moles of the isocyanate group in the polyisocyanate mixture (B)×42 (molecular weight of NCO)]/[total amount (g) of the polyisocyanate mixture (B)]. The polyisocyanate mixture (B) preferably has NCO content (NCO %) of 0.1 mass % or more, more preferably 0.2 mass % or more, even more preferably 0.3 mass % or more, and preferably has NCO content (NCO %) of 10 mass % or less, more preferably 7.0 mass % or less, even more preferably 5.0 mass % or less, even more preferably 3.0 mass % or less.

If he NCO content (NCO %) of the polyisocyanate mixture (B) is too low, the effect of the abrasion-resistance may not be obtained due to the small degree of the crosslinking, while if the NCO content (NCO %) is too high, the moldability may be lowered because of the high viscosity of the cover composition.

The cover composition used in the present invention preferably contains the polyisocyanate mixture (B) in an amount of 1 part by mass or more, more preferably 3 parts by mass or more, even more preferably 5 parts by mass or more, and preferably 50 parts by mass or less, more preferably 30 parts by mass or less, even more preferably 20 parts by mass or less based on 100 parts by mass of the thermoplastic polyurethane (A). If the content of the polyisocyanate mixture (B) is outside the above range, a sufficient crosslinked structure may not be obtained, or crosslinking density may become too high, so that durability may be undermined.

The total content of the thermoplastic polyurethane (A) and the polyisocyanate mixture (B) contained in the resin component constituting the cover composition used in the present invention, is preferably 50 mass % or more, more preferably 60 mass % or more, even more preferably 70 mass % or more. It is also a preferred embodiment that the cover composition used in the present invention, as the resin component, consists of the thermoplastic polyurethane (A) and the polyisocyanate mixture (B).

In the present invention, as the resin component of the cover composition, other resin components that can be used to the extent that the effects of the present invention are not damaged include, for example, an ionomer resin and a thermoplastic elastomer. Examples of the ionomer resin include one prepared by neutralizing at least a part of carboxyl groups in a copolymer composed of ethylene and α, β-unsaturated carboxylic acid having 3 to 8 carbon atoms with a metal ion, one prepared by neutralizing at least a part of carboxyl groups in a ternary copolymer composed of ethylene, α, β-unsaturated carboxylic acid having 3 to 8 carbon atoms, and α, β-unsaturated carboxylic acid ester with a metal ion, or a mixture thereof. The specific examples of the ionomer resin include Himilan available from MITSUI-DUPONT POLY-CHEMICAL, Surlyn available from DUPONT CO., and Iotek available from ExxonMobil Corp. The specific examples of the thermoplastic elastomer include a thermoplastic polyamide elastomer having a commercial name of "PEBAX", for example, "PEBAX 2533" available from ARKEMA Inc, a thermoplastic polyester elastomer having a commercial name of "HYTREL", for example, "HYTREL 3548", and "HYTREL 4047" available from DU PONT- TORAY Co., and a thermoplastic polystyrene elastomer having a commercial name of "Rabalon" available from Mitsubishi Chemical Co.

The cover composition used in the golf ball of the present invention may contain, other than the above-mentioned resin component, a pigment component such as titanium oxide and a blue pigment, a gravity adjusting agent such as calcium carbonate and barium sulfate, a dispersant, an antioxidant, an ultraviolet absorber, a light stabilizer, a fluorescent material or a fluorescent brightener to the extent that the cover performance is not damaged.

The content of the white pigment (titanium oxide) is preferably 0.5 part by mass or more, more preferably 1 part by mass or more, and preferably 10 parts by mass or less, more preferably 8 parts by mass or less based on 100 parts by mass of the base resin constituting the cover. The white pigment in an amount of 0.5 part by mass or more can impart opacity to the cover, while the white pigment in an amount of more than 10 parts by mass may lower the durability of the resulting cover.

The cover composition of the present invention has slab hardness of more than 60, more preferably 62 or more, even more preferably 63 or more, and has a slab hardness of 75 or less, more preferably 72 or less, even more preferably 70 or less in Shore D hardness. If the slab hardness of the cover composition is 60 or less, the repulsion (flight distance) of the golf ball may be lowered. On the other hand, if the slab hardness is more than 75, the abrasion resistance and the durability of the formed cover may be lowered. Herein, the slab hardness of the cover composition means the hardness when measuring the hardness of the cover composition which is formed into a sheet, and the measuring method is described later.

In the method for preparing the golf ball of the present invention, the thermoplastic polyurethane (A) and the polyisocyanate mixture (B) in which the urethane prepolymer (b-1) is dispersed in the thermoplastic resin (b-2) which does not substantially react with the isocyanate group are blended to obtain a cover composition. The blending of the cover composition is preferably carried out using, for example, a mixer capable of blending a raw material in the form of pellet, more preferably a tumbler type mixer. An embodiment of blending the cover composition include, for example, an embodiment of mixing an additive for the cover such as titanium oxide with the thermoplastic polyurethane (A) and subjecting the resultant mixture to extrusion to prepare a white pellet in advance, and then dry-blending the white pellet and the pellet of the polyisocyanate mixture (B); an embodiment of mixing the thermoplastic polyurethane (A), the polyisocyanate mixture (B) and the additive for a cover such as titanium oxide, and subjecting the resultant mixture to extrusion to prepare a white pellet in advance; and an embodiment of mixing the polyisocyanate mixture (B) and the additive for a cover such as titanium oxide and subjecting the resultant mixture to extrusion to prepare a white pellet in advance, and dry-blending the white pellet and a pellet of the thermoplastic polyurethane (A).

An embodiment for molding a cover is not particularly limited, and includes an embodiment which comprises injection molding the cover composition directly onto the core, or an embodiment which comprises molding the cover composition into a hollow-shell, covering the core with a plurality of the hollow-shells and subjecting the core with a plurality of the hollow shells to the compression-molding (preferably an embodiment which comprises molding the cover composition into a half hollow-shell, covering the core with the two half hollow-shells, and subjecting the core with the two half hollow-shells to the compression-molding).

Molding of the half shell can be performed by either compression molding method or injection molding method, and the compression molding method is preferred. The compression-molding of the cover composition into half shell can be carried out, for example, under a pressure of 1 MPa or more and 20 MPa or less at a temperature of −20° C. or more and 70° C. or less relative to the flow beginning temperature of the cover composition. By performing the molding under the above conditions, a half shell having a uniform thickness can be formed. Examples of a method for molding the cover using half shells include compression molding by covering the core with two half shells. The compression molding of half shells into the cover can be carried out, for example, under a pressure of 0.5 MPa or more and 25 MPa or less at a temperature of −20° C. or more and 70° C. or less relative to the flow beginning temperature of the cover composition. By performing the molding under the above conditions, a cover for a golf ball having a uniform thickness can be formed.

In the present invention, the cover can be formed by injection molding the cover composition directly onto the core. In the case that the cover composition is subjected to direct injection molding onto the core, it is preferred to use upper and lower molds for forming a cover having a spherical cavity and pimples, wherein a part of the pimple also serves as a retractable hold pin. When forming the cover by injection molding, the hold pin is protruded to hold the core, and the cover composition which has been heated and melted is charged and then cooled to obtain a cover. For example, the cover composition heated and melted at the temperature of 150° C. to 250° C. is charged into a mold held under the pressure of 9 MPa to 15 MPa for 0.5 to 5 second. After cooling for 10 to 60 seconds, the mold is opened and the golf ball with the cover molded is taken out from the mold. The crosslinking can be further proceeded by post-curing the golf ball having the molded cover at the temperature of 40° C. or more for 4 to 96 hours.

In the present invention, use of the thermoplastic polyurethane (A) and the polyisocyanate mixture (B) suppresses the crosslinking reaction when molding the cover, and promotes the crosslinking reaction after molding the cover, thereby improving the abrasion-resistance of the cover without scarifying the productivity of the golf ball. The crosslinking of the cover can be confirmed by the following method.

The thermoplastic polyurethane (A) crosslinked with the polyisocyanate mixture (B) is insoluble in the solvent in which the linear thermoplastic polyurethane (A) is soluble. The solvent in which the linear thermoplastic polyurethane (A) is soluble includes, for example, N,N-dimethylformamide (DMF), tetrahydrofuran (THF) or the like. Namely, the thermoplastic polyurethane without being crosslinked is readily soluble in the solvent, but the thermoplastic polyurethane crosslinked with the polyisocyanate mixture (B) is insoluble in the solvent. According to this difference, it is possible to confirm whether the thermoplastic polyurethane is crosslinked or not.

Further, the thermoplastic polyurethane (A) crosslinked with the polyisocyanate mixture (B) has an allophanate bond or a biuret bond formed. These bonds are weaker than the urethane bond or the urea bond which constitute the main molecular chain of the thermoplastic polyurethane. Accordingly, the allophanate bond or a biuret bond forming the crosslinking structure can be broken by a treatment with a DMF solution of n-butylamine or a heat treatment.

The DMF solution of n-butyl amine preferably has a concentration of 0.01 mol/l to 0.25 mol/l, more preferably 0.05 mol/l. The heat treatment is preferably conducted at the temperature of 130 to 150° C. for 2 to 4 hours.

In addition, it is possible to confirm what kind of the polyisocyanate mixture crosslinks the thermoplastic polyurethane, by analyzing the product which is treated with the DMF solution of n-butyl amine or treated with heat, using gel permeation chromatography (GPC), Fourier transform infrared spectrophotometer (FT-IR), nuclear magnetic resonance apparatus (NMR) or the like.

After the cover is molded, the mold is opened and the golf ball body is taken out from the mold, and as necessary, the golf ball body is preferably subjected to surface treatment such as deburring, cleaning, and sandblast. If desired, a paint film or a mark may be formed.

In the present invention, the golf ball preferably has the cover with a thickness of 2.5 mm or less, more preferably 2.0 mm or less, even more preferably 1.5 mm or less. If the thickness of the cover is 2.5 mm or less, the diameter of the core can be enlarged. Thus, the resilience of the golf ball will become higher and a total flying distance will become longer. The lower limit of the thickness of the cover is preferably, for example, but not limited to, 0.3 mm, more preferably 0.5 mm, even more preferably 1.0 mm. If the thickness is less than 0.3 mm, the durability of the golf ball may be lowered.

When molding a cover, the concaves called "dimple" are usually formed on the surface. FIG. 1 is an expanded sectional view of a part of a golf ball 2. This figure shows a cross-section which includes the deepest part De of a dimple 10 and the center of the golf ball 2. The up and down direction in FIG. 1 is the depth direction of the dimple 10. The depth direction is the direction from the gravity center of the area of the dimple 10 to the center of the golf ball 2. A chain double-dashed line 14 in FIG. 1 shows a virtual sphere. The surface of the virtual sphere 14 is the surface of the golf ball 2 in the case of assuming that there is no dimple 10. The dimple 10 is depressed in the virtual sphere 14. A land 12 corresponds to the virtual sphere 14.

Two headed arrow Di in FIG. 1 shows the diameter of the dimple 10. The diameter Di is the distance from one contact point Ed to another contact point Ed when a common tangent line T is drawn in both sides of the dimple 10. The contact points Ed are edges of the dimple 10. The edges Ed define the outline of the dimple 10. The diameter Di is preferably 2.0 mm or more and 6.0 mm or less. If the diameter Di is less than 2.0 mm, the dimple effect is hardly obtained and if the diameter Di exceeds 6.0 mm, the intrinsic property of the golf ball 2, that is, it is substantially spherical, is lost.

The area s of the dimple 10 is the area surrounded by the edge line in the case the center of the golf ball 2 is observed from infinity (that is, a plane area). The area s can be calculated according to a formula: $s=(Di/2)^2 \times \pi$. The ratio of the total of the area s of all the dimples 10 occupying the surface area of the virtual sphere 14 is called as an occupation ratio. The occupation ratio is preferably 75% or higher from a viewpoint that a sufficient dimple effect can be obtained.

The volume of the dimple means the volume of the portion surrounded with the curved plane including the outline of the dimple 10 and the virtual sphere 14. The total volume of the dimples 10 is preferably 250 mm$^3$ or more and 400 mm$^3$ or less. If the total volume is less than 250 mm$^3$, a hopping trajectory may be provided in some cases. If the total volume exceeds 400 mm$^3$, a dropping trajectory may possibly be provided.

In FIG. 1, the distance between the tangent line T and the deepest point De is the depth of the dimple 10. The depth is preferably 0.05 mm or more and 0.60 mm or less. If the depth is less than 0.05 mm, a hopping trajectory may be provided in some cases. On the other hand, if the depth exceeds 0.60 mm, a dropping trajectory may possibly be provided. The total number of the dimples 10 is preferably 200 or more and 500 or less. If the total number is less than 200, the dimple effect is hardly obtained. On the other hand, if the total number exceeds 500, the dimple effect is hardly obtained because the size of the respective dimples 10 is small.

Next, a preferred embodiment of the core of the golf ball of the present invention will be explained.

The core of the golf ball of the present invention includes a single-layered core, a core consisting of a center and a single-layered intermediate layer covering the core, a core consisting of a center and multi-piece intermediate layers covering the center, or a core consisting of a center and multi-layered intermediate layers covering the center. The core preferably has a spherical shape. If the core does not have a spherical shape, the cover does not have a uniform thickness. As a result, there exist some portions where the performance of the cover is lowered. On the other hand, the center generally has the spherical shape, but the center may be provided with a rib on the surface thereof so that the surface of the spherical center is divided by the ribs, preferably the surface of the spherical center is evenly divided by the ribs. In one embodiment, the ribs are preferably formed on the surface of the spherical center in an integrated manner, and in another embodiment, the ribs are formed as an intermediate layer on the surface of the spherical center.

The ribs are preferably formed along an equatorial line and meridians that evenly divide the surface of the spherical center, if the spherical center is assumed as the earth. For example, if the surface of the spherical center is evenly divided into 8, the ribs are formed along the equatorial line, any meridian as a standard, and meridians at the longitude 90 degrees east, longitude 90 degrees west, and the longitude 180 degrees east (west), assuming that the meridian as the standard is at longitude 0 degrees. If the ribs are formed, the depressed portion divided by the ribs are preferably filled with a plurality of intermediate layers or with a single-layered intermediate layer that fills each of the depressed portions to make a core in the spherical shape. The shape of the ribs, without limitation, includes an arc or an almost arc (for example, a part of the arc is removed to obtain a flat surface at the cross or orthogonal portions thereof).

As the core or the center of the golf ball of the present invention, a conventionally known rubber composition (hereinafter simply referred to as "rubber composition for the core" occasionally) may be employed, and it can be molded by, for example, heat-pressing a rubber composition containing a base rubber, a crosslinking initiator, a co-crosslinking agent, and a filler.

As the base rubber, a natural rubber and/or a synthetic rubber such as a polybutadiene rubber, a natural rubber, a polyisoprene rubber, a styrene polybutadiene rubber, and ethylene-propylene-diene terpolymer (EPDM) may be used. Among them, typically preferred is the high cis-polybutadiene having cis-1,4 bond in a proportion of 40% or more, more preferably 70% or more, even more preferably 90% or more in view of its superior repulsion property.

The crosslinking initiator is blended to crosslink the base rubber component. As the crosslinking initiator, an organic peroxide is preferably used. Examples of the organic peroxide for use in the present invention are dicumyl peroxide, 1,1-bis(t-butylperoxy)-3,5-trimethylcyclohexane, 2,5-dimethyl-2,5-di(t-butylperoxy)hexane, and di-t-butyl peroxide. Among them, dicumyl peroxide is preferable. An amount of the crosslinking initiator to be blended in the rubber composition is preferably 0.2 part by mass or more, more preferably 0.3 part by mass or more, and preferably 3 parts by mass or less, more preferably 2 parts by mass or less based on 100 parts by mass of the base rubber. If the amount is less than 0.2 part by mass, the core becomes too soft, and the resilience tends to be lowered, and if the amount is more than 3 parts by mass, the amount of co-crosslinking agent needs to be increased in order to obtain an appropriate hardness, so that the resilience tends to be insufficient.

The co-crosslinking agent is not particularly limited as long as it has the effect of crosslinking a rubber molecule by graft polymerization with a base rubber molecular chain; for example, α, β-unsaturated carboxylic acid having 3 to 8 carbon atoms or a metal salt thereof, more preferably acrylic acid, methacrylic acid or a metal salt thereof may be used. As the metal constituting the metal salt, for example, zinc, magnesium, calcium, aluminum and sodium may be used, and among them, zinc is preferred because it provides high resilience.

The amount of the co-crosslinking agent to be used is preferably 10 parts or more, more preferably 20 parts or more, and is preferably 50 parts or less, more preferably 40 parts or less based on 100 parts of the base rubber by mass. If the amount of the co-crosslinking agent to be used is less than 10 parts by mass, the amount of the organic peroxide must be increased to obtain an appropriate hardness, which tends to lower the resilience. On the other hand, if the amount of the co-crosslinking agent to be used is more than 50 parts by mass, the core becomes too hard, so that the shot feeling may be lowered.

The filler contained in the rubber composition for the core is mainly blended as a gravity adjusting agent in order to adjust the specific gravity of the golf ball obtained as the final product in the range of 1.0 to 1.5, and may be blended as required. Examples of the filler include an inorganic filler such as zinc oxide, barium sulfate, calcium carbonate, magnesium oxide, tungsten powder, and molybdenum powder. The amount of the filler to be blended in the rubber composition is preferably 2 parts or more, more preferably 3 parts or more, and preferably 50 parts or less, more preferably 35 parts or less based on 100 parts of the base rubber by mass. If the amount of the filler to be blended is less than 2 parts by mass, it becomes difficult to adjust the weight, while if it is more than 50 parts by mass, the weight ratio of the rubber component becomes small and the resilience tends to be lowered.

As the rubber composition for the core, an organic sulfur compound, an antioxidant or a peptizing agent may be blended as appropriate in addition to the base rubber, the crosslinking initiator, the co-crosslinking agent and the filler.

As the organic sulfur compound, a diphenyl disulfide or a derivative thereof may be preferably used. The amount of the diphenyl disulfide or the derivative thereof to be blended is preferably 0.1 part by mass or more, more preferably 0.3 part by mass or more, and preferably 5.0 parts by mass or less, more preferably 3.0 parts by mass or less relative to 100 parts by mass of the base rubber. Examples of the diphenyl disulfide or the derivative thereof include diphenyl disulfide, a mono-substituted diphenyl disulfide such as bis(4-chlorophenyl) disulfide, bis(3-chlorophenyl)disulfide, bis(4-bromophenyl)disulfide, bis(3-bromophenyl)disulfide, bis(4-fluorophenyl)disulfide, bis(4-iodophenyl)disulfide and bis(4-cyanophenyl)disulfide; a di-substituted diphenyl disulfide such as bis(2,5-dichlorophenyl)disulfide, bis(3,5-dichlorophenyl)disulfide, bis(2,6-dichlorophenyl)disulfide, bis(2,5-dibromophenyl)disulfide, bis(3,5-dibromophenyl)disulfide, bis(2-chloro-5-bromophenyl)disulfide, and bis(2-cyano-5-bromophenyl)disulfide; a tri-substituted diphenyl disulfide such as bis (2,4,6-trichlorophenyl)disulfide, and bis (2-cyano-4-chloro-6-bromophenyl)disulfide; a tetra-substituted diphenyl disulfide such as bis(2,3,5,6-tetra chlorophenyl)disulfide; a penta-substituted diphenyl disulfide such as bis(2,3,4,5,6-pentachlorophenyl)disulfide and bis(2,3,4,5,6-pentabromophenyl)disulfide. These diphenyl disulfides or the derivative thereof can enhance resilience by having some influence on the state of vulcanization of vulcanized rubber. Among them, diphenyl disulfide and bis(pentabromophenyl) disulfide are preferably used since a golf ball having particularly high resilience can be obtained.

The amount of the antioxidant to be blended is preferably 0.1 part or more and is preferably 1 part or less based on 100 parts of the base rubber by mass. Further, the peptizing agent is preferably 0.1 part or more and is preferably 5 parts or less based on 100 parts of the base rubber by mass.

The conditions for press-molding the rubber composition should be determined depending on the rubber composition. The press-molding is preferably carried out for 10 to 60 minutes at the temperature of 130 to 200° C. Alternatively, the press-molding is preferably carried out in a two-step heating, for example, for 20 to 40 minutes at the temperature of 130 to 150° C., and continuously for 5 to 15 minutes at the temperature of 160 to 180° C. When forming a core having a difference in the hardness between the surface hardness Hs and the center hardness Ho, it is preferable to heat for 10 to 60 minutes at the temperature of 130 to 200° C.

The diameter of the core of the golf ball of the present invention is preferably 36.7 mm or more, more preferably 37.7 mm or more, even more preferably 38.7 mm or more. If the diameter of the core is less than 36.7 mm, the thickness of the cover becomes too thick, so that the resilience is lowered. The upper limit of the diameter of the core is not particularly limited, but it is preferably 42.1 mm, more preferably 41.7 mm, even more preferably 40.7 mm. If the diameter of the core is more than 42.1 mm, the cover becomes relatively too thin, so that the protection effects of the cover cannot be sufficiently obtained.

It is a preferred embodiment that the core having a surface hardness Hs larger than the center hardness Ho is used. The difference between the surface hardness Hs and the center hardness Ho of the core used for the golf ball of the present invention is preferably 20 or more, more preferably 25 or more in Shore D hardness. By making the core have the surface hardness larger Hs than the center hardness Ho, a launch angle is increased and an amount of spin is lowered, so that flying distance is improved. The upper limit of the difference between the surface hardness Hs and the center hardness Ho of the core is not limited, but preferably 40, more preferably 35 in Shore D hardness. If the difference of the hardness is too large, the durability tends to be lowered.

The center hardness Ho of the core is preferably 30 or more, more preferably 32 or more, even more preferably 35 or more in Shore D hardness. If the center hardness Ho of the core is less than 30 in Shore D hardness, the golf ball tends to become so soft that the resilience will be lowered. On the other hand, the center hardness Ho of the core is preferably 50 or less, more preferably 48 or less, even more preferably 45 or less in shore D hardness. If the center hardness Ho is more than 50 in Shore D hardness, the golf ball becomes so hard that the shot feeling may be lowered. In the present invention, the center hardness Ho of the core means the hardness obtained by measuring the central point of the cut surface of the core cut into halves with the Shore D type spring hardness tester.

The surface hardness Hs of the core is preferably 45 or more, more preferably 50 or more, even more preferably 55 or more in Shore D hardness. If the surface hardness Hs is less than 45 in Shore D hardness, the golf ball may become too soft, resulting in lowering of resilience. On the other hand, the surface hardness Hs of the core is preferably 65 or less, more preferably 62 or less, even more preferably 60 or less in Shore D hardness. If the surface hardness Hs is larger than 65 in Shore D hardness, the golf ball may become too hard, resulting in lowering of the shot feeling.

In the case that the core of the present invention has the structure which comprises a center and a single-layered intermediate layer covering the center, or the structure which comprises a center and multi-piece or multi-layered intermediate layers covering the center, the center preferably has a diameter of 10 mm or more, more preferably 15 mm or more, and preferably has a diameter of 41 mm or less, more preferably 35 mm or less. If the diameter of the center is less than 10 mm, the repulsion may be lowered as a result. On the other hand, if the diameter of the center is more than 41 mm, the thickness of the intermediate layer or the cover layer should be made thinner than the desired thickness, as a result, the intermediate layer or the cover layer may not function sufficiently.

In the case that the center has a diameter from 10 mm to 41 mm, a compression deformation amount (deformation amount along the shrinkage direction) of the center when applying a load from 98 N as an initial load to 1275 N as a final load is preferably 2.0 mm or more, more preferably 2.50 mm or more, and preferably 7.0 mm or less, even more preferably 6.0 mm or less. If the above deformation amount is less than 2.0 mm, the center becomes too hard, so that the shot feeling tends to be lowered. If the above deformation amount is larger than 7.0 mm, the repulsion may be lowered.

The center hardness Ho1 of the center is preferably 25 or more, more preferably 27 or more, even more preferably 30 or more, and is preferably 45 or less, more preferably 43 or less, and even more preferably 40 or less in Shore D hardness. If the center hardness Ho1 of the center is less than 25, the center may possibly become so soft as to lower the durability in some cases. If the center hardness Ho1 of the center exceeds 45, the center may possibly become too hard and the shot feeling tends to be worsened.

The surface hardness Hs1 of the center is preferably 40 or more, more preferably 45 or more, even more preferably 50 or more, and is preferably 65 or less, more preferably 62 or less, even more preferably 60 or less, and particularly preferably 58 or less in Shore D hardness. If the surface hardness Hs1 of the center is less than 40 in Shore D hardness, the center may possibly become so soft as to lower the repulsion property in some cases. On the other hand, if the surface hardness Hs1 of the center exceeds 65 in Shore D hardness, the center may possibly become too hard and the shot feeling tends to be deteriorated in some cases.

It is a preferred embodiment that the center having a surface hardness Hs1 larger than the center hardness Ho1 is used. The hardness difference (Hs1-Ho1) between the surface hardness Hs1 and the center hardness Ho1 in Shore D hardness is preferably 8 or higher, more preferably 10 or higher, and is preferably 25 or lower, and more preferably 23 or lower. If the hardness difference is more than 25, the durability is lowered and if the hardness difference is lower than 8, the shot feeling may possibly become hard and the impact becomes large in some cases. The hardness difference of the center can be provided by properly selecting the heat molding conditions of the center.

As the intermediate layer, for example, a thermoplastic polyamide elastomer having a commercial name of "PEBAX", for example, "PEBAX 2533", available from ARKEMA Inc; a thermoplastic polyester elastomer having a commercial name of "HYTREL", for example, "HYTREL 3548" and "HYTREL 4047" available from DU PONT-TORAY Co.; a thermoplastic polystyrene elastomer having a commercial name of "Rabalon" available from Mitsubishi Chemical Co.; and a thermoplastic polyurethane elastomer having a commercial name of "ELASTOLLAN", for example, "ELASTOLLAN XNY97A" available from BASF Japan may be used in addition to the cured product of the rubber composition and the conventional ionomer resins. Examples of the ionomer resin include an ionomer resin prepared by neutralizing at least a part of carboxyl groups in a copolymer composed of ethylene and $\alpha$, $\beta$-unsaturated carboxylic acid having 3 to 8 carbon atoms with a metal ion, one prepared by neutralizing at least a part of carboxyl groups in a ternary copolymer composed of ethylene, $\alpha$, $\beta$-unsaturated carboxylic acid having 3 to 8 carbon atoms and $\alpha$, $\beta$-unsaturated carboxylic acid ester with a metal ion, or a mixture thereof.

Specific examples of the ionomer resins include, but not limited to, Himilan 1555(Na), Himilan 1557(Zn), Himilan 1605 (Na), Himilan 1706(Zn), Himilan 1707 (Na), Himilan AM7311 (Mg), and examples of the ternary copolymer ionomer resin include Himilan 1856(Na) and Himilan 1855(Zn) available from MITSUI-DUPONT POLYCHEMICAL CO., LTD.

Further, ionomer resins available from DUPONT CO. include Surlyn 8945(Na), Surlyn 9945(Zn), Surlyn 8140(Na), Surlyn 8150(Na), Surlyn 9120(Zn), Surlyn 9150 (Zn), Surlyn 6910(Mg), Surlyn 6120(Mg), Surlyn 7930(Li), Surlyn 7940(Li), Surlyn AD8546(Li), and examples of the ternary copolymer ionomer resin include Surlyn 8120(Na), Surlyn 8320(Na), Surlyn 9320(Zn), and Surlyn 6320(Mg).

Ionomer resins such as Iotek 8000(Na), Iotek 8030(Na), Iotek 7010(Zn), and Iotek 7030(Zn) are available from Exxon Co. Examples of the ternary copolymer ionomer resin include Iotek 7510(Zn) and Iotek 7520(Zn). The ionomer resins exemplified above can be used alone, or as a mixture of two or more.

Na, Zn, K, Li, or Mg described in the parentheses after the commercial name of the ionomer resin represents a kind of metal used for neutralization.

The intermediate layer is formed, for example, by covering the center with the intermediate layer composition. An embodiment for molding the intermediate layer is not particularly limited, and includes an embodiment which comprises injection molding the intermediate layer composition directly onto the center, or an embodiment which comprises molding the intermediate layer composition into a half hollow-shell, covering the center with the two hollow-shells and subjecting the center with the two hollow shells to the compression-molding for 1 to 5 minutes at the temperature of 130° C. to 170° C.

The intermediate layer of the golf ball of the present invention preferably has a slab hardness of 45 or more, more preferably 47 or more, even more preferably 50 or more, and preferably has a slab hardness of 70 or less, more preferably 68 or less, even more preferably 65 or less in Shore D hardness. By making the slab hardness of the intermediate layer 45 or more in Shore D hardness, the core can be designed to have a hard outer and soft inner structure. As a result, a long flight distance can be achieved by high launch angle and low spin rate. If the slab hardness of the intermediate layer is not more than 70 in Shore D hardness, the excellent shot feeling can be obtained. Further, the controlability can be enhanced by the improved spin rate. Herein, the slab hardness of the intermediate layer means a hardness when measuring the hardness of the intermediate layer composition which is formed into a sheet, and the measuring method is described later. In addition, the slab hardness of the intermediate layer can be appropriately adjusted by the selection of the above mentioned resin component or the rubber composition, and the amount of the additives.

A structure of the golf ball of the present invention, it may be a two-piece golf ball having a core and a cover covering the core; a three-piece golf ball having a core consisting of a center and a single intermediate layer covering the center, and the cover covering the core; a multi-piece golf ball having a core consisting of a center and multi-piece or multi-layered intermediate layers covering the center, and a cover covering the core. Among them, the present invention can be preferably applied to the two-piece golf ball having a core and a cover covering the core, and the three-piece golf ball having a core consisting of a center and a single layered intermediate layer covering the center, and a cover covering the core.

EXAMPLES

The following examples illustrate the present invention, however these examples are intended to illustrate the invention and are not to be construed to limit the scope of the present invention. Many variations and modifications of such examples will exist without departing from the scope of the inventions. Such variations and modifications are intended to be within the scope of the invention.

[Evaluation]

(1) Slab Hardness (Shore D Hardness)

Using the cover composition or the intermediate layer composition, a sheet having a thickness of about 2 mm were prepared by hot press molding and preserved at the temperature of 23° C. for two weeks. Three or more of the sheets were stacked on one another to avoid being affected by the measuring substrate on which the sheets were placed, and the stack was subjected to the measurement using P1 type auto hardness tester provided with the Shore D type spring hardness tester prescribed by ASTM-D2240, available from KOUBUNSHI KEIKI CO., LTD.

(2) Center Hardness, Core Hardness (Shore D Hardness)

The shore D hardness measured at a surface part of a core or a center using P1-type automatic rubber hardness tester equipped with the Shore D type spring hardness tester specified by ASTM-D2240 manufactured by Kobunshi Keiki Co., Ltd., was determined as the surface hardness Hs of the core or the surface hardness Hs1 of the center, and the shore D hardness obtained by cutting a spherical core or center into halves and measuring at a center of the cut surface was determined as the center hardness Ho of the core or the center hardness Ho1 of the center.

(3) Flight Performance at a Driver Shot (Head Speed=45 m/s)

A W#1 driver with a metal head (manufactured by SRI Sports Ltd, XXIO, S shaft, loft 11°) was attached to a swing robot M/C manufactured by Golf Laboratories, Inc. and respective golf balls were hit at a head speed of 45 m/second to measure the speed (m/s) and spin rate (rpm) right after hitting, and the flight distance (distance (m) from the launching point to the stop point). The measurement was carried out 10 times for each golf ball and the average value was defined as the flight distance. The speed and the spin rate of the golf ball right after the hitting were measured by continuously taking pictures of the hit golf ball.

(4) Abrasion-Resistance

A commercially available sand wedge (S shaft) was installed on a swing robot M/C manufactured by Golf Laboratories, Inc., and two points of a ball respectively were hit once at the head speed of 36 m/sec. to observe the areas which were hit. Abrasion-resistance was evaluated and ranked into four levels based on following criteria.

E(Excellent): Almost no scratch was present on the surface of the golf ball.

G(Good): Slight scratches were present on the surface of the golf ball, but were not conspicuous.

F(Fair): Scratches were conspicuous, and scuffing could be observed.

P(Poor): The surface of the golf ball was abraded considerably, and scuffing was conspicuous.

(5) Durability

Each golf ball was repeatedly hit with a metal head driver (manufactured by SRI Sports Ltd, XXIO, S shaft, loft 11°) attached to a swing robot M/C manufactured by Golf Laboratories, at the head speed of 45 m/sec. to make the golf ball collide with a collision board. Times up to which the golf balls are cracked were measured. In addition, each value obtained was reduced to an index number relative to the measured value obtained in Golf ball No. 10 being assumed 100. The larger number indicates better durability.

[Preparation of Polyisocyanate Mixture (B)]

A predetermined amount of the polyisocyanate and the polyol shown in Table 1 were used to carry out a reaction at 80° C. for 2 hours under a dried nitrogen atmosphere, thereby obtaining an isocyanate group-terminated urethane prepolymer (b-1).

TABLE 1

| Raw Material | | | Num. Average molecular weight | Polyisocyanate mixture (B) | | | | | | | | L.M. Polyisocyanate mixture | |
|---|---|---|---|---|---|---|---|---|---|---|---|---|---|
| | | | | 1 | 2 | 3 | 4 | 5 | 6 | 7 | 8 | 1 | 2 |
| Urethane prepolymer (b-1) | Poly isocyanate | MDI | 250 | 250 | 250 | 250 | 250 | — | — | — | — | 250 | — |
| | | $H_{12}MDI$ | 262 | — | — | — | — | 262 | 262 | 262 | 262 | — | 262 |
| | Polyol | PTMG1000 | 1000 | 500 | 750 | — | — | 500 | 750 | — | — | — | — |
| | | PTMG2000 | 2000 | — | — | 1000 | 1500 | — | — | 1000 | 1500 | — | — |
| Thermoplastic polyester(b-2) | | HYTREL 3046 | — | 1500 | 2000 | 2500 | 3500 | 1524 | 2024 | 2524 | 3524 | 500 | 500 |
| NCO content (NCO %) of Urethane prepolymer (b-1) | | | | 5.6 | 2.1 | 3.4 | 1.2 | 5.5 | 2.1 | 3.3 | 1.2 | — | — |
| NCO content (NCO %) of Polyisocyanate mixture (B) | | | | 1.9 | 0.7 | 1.1 | 0.4 | 1.8 | 0.7 | 1.1 | 0.4 | 11.2 | 11.0 |

Formulation: g

Notes on Table 1

L.M. polyisocyanate mixture: Low molecular weight polyisocyanate mixture

MDI: 4,4'-diphenylmethane diisocyanate manufactured by Tokyo Chemical Industry Co., Ltd.

$H_{12}MDI$: 4,4'-dicyclohexylmethane diisocyanate manufactured by Tokyo Chemical Industry Co., Ltd.

PTMG1000: polyoxytetramethylene glycol, having a number average molecular weight of 1000 manufactured by Mitsubishi Chemical Co.

PTMG2000: polyoxytetramethylene glycol having a number average molecular weight of 2000 manufactured by Mitsubishi Chemical Co.

As the thermoplastic resin which does not substantially react with an isocyanate group, one obtained by drying to dehydrate in advance a thermoplastic polyester elastomer ("HYTREL 3046" manufactured by DU PONT-TORAY Co,) (b-2) was prepared. The above mentioned isocyanate group-terminated urethane prepolymer (b-1) and the thermoplastic polyester elastomer (b-2) were blended in a proportion of 1:2 by mass ratio, and were kneaded in a mixing roll at the temperature of 120° C. to 180° C. for 5 to 10 minutes. The resultant mixture was discharged and pulverized, thereby obtaining a pellet of the polyisocyanate mixture (B).

[Preparation of Golf Ball]

(1) Preparation of Core

The rubber composition shown in Table 2 was kneaded and pressed with upper and lower molds each having a spherical cavity at the heating condition of 160° C. for 13 minutes to obtain the center in a spherical shape. When forming a two-piece golf ball, the spherical center is used directly as a core.

TABLE 2

| | Center composition | |
|---|---|---|
| Formulation | Polybutadiene Rubber | 100.0 |
| | Zinc acrylate | 35.0 |
| | Zinc oxide | 5.0 |
| | Dicumyl peroxide | 0.9 |
| | Diphenyl disulfide | 0.5 |
| | Barium sulfate | Proper amount*) |
| Property | Central hardness Ho1 (Shore D) | 35 |
| | Surface hardness Hs1 (Shore D) | 55 |

Formulation: mass part
*)Adjusted to give golf ball weight of 45.4 g depending on the cover composition.
Notes on Table 2
Polybutadiene rubber: BR730 (high cis-polybutadiene) manufactured by JSR Corporation
Zinc acrylate: ZNDA-90S manufactured by NIHON JYORYU KOGYO Co,. LTD.
Zinc oxide: Ginrei R manufactured by Toho-Zinc Co.
Barium sulfate: Barium sulfate BD manufactured by Sakai Chemical Industry Co. Ltd.
Dicumyl peroxide: Percumyl D manufactured by NOF Corporation
Diphenyl disulfide: manufactured by Sumitomo Seika Chemicals Company Limited When forming a three-piece golf ball, the materials shown in Table 3 were mixed using a twin-screw kneading extruder to obtain the intermediate layer composition in the form of pellet. The extrusion was conducted in the following conditions: screw mm, screw revolutions=200 rpm, screw L/D=35, and the intermediate composition was heated to from 150° C. to 230° C. at the die position of the extruder. Subsequently, the resultant intermediate layer composition was injection-molded directly onto the center thus obtained to form a core which comprises a center and the intermediate layer (thickness:1.3 mm) covering the center.

TABLE 3

| | Intermediate Layer composition | |
|---|---|---|
| Formulation | Himilan 1605 | 50 |
| | Himilan 1705 | 40 |
| | Rabalon T3339C | 10 |
| Slab hardness (Shore D) | | 59 |

Formulation: mass part
Note on table 3
Himilan 1605: sodium ion-neutralized ethylene-methacrylic acid copolymerized ionomer resin manufactured by MITSUI-DUPONT POLYCHEMICAL CO., LTD.
Himilan 1705: zinc ion-neutralized ethylene-methacrylic acid copolymerized ionomer resin manufactured by MITSUI-DUPONT POLYCHEMICAL CO., LTD.
Rabalon T3339C: polystyrene elastomer manufactured by Mitsui Chemicals, Inc.

(2) Preparation of Cover Composition and Golf Ball Body

Thermoplastic polyurethane (A) (Elastollan ET858D, ET864D, 1174D, HM76D available from BASF Japan Ltd.) in the form of a pellet, polyisocyanate mixture (B) in the form of a pellet, and an additive for cover (titanium oxide) shown in Tables 5 and 6 were dry-blended using a tumbler type mixer to prepare a cover composition. The blending ratio of the polyisocyanate mixture (B) to the thermoplastic polyurethane (A) was adjusted to have an almost same NCO content with respect to 100 mass parts of the thermoplastic polyurethane (A).

(2-1) Injection-Molding

The resultant cover composition was injection-molded onto the core thus obtained to form the cover. The upper and lower molds for forming the cover have a spherical cavity with pimples. The part of the pimples can serve as a hold pin which is retractable. When forming the golf ball body, the hold pins were protruded to hold the core, and the resin heated at 210° C. was charged into the mold held under the pressure of 80 tons for 0.3 seconds. After the cooling for 30 seconds, the molds were opened and then the golf ball body was discharged.

(2-2) Compression-Molding

Molding of half shells were performed by charging a pellet of the cover composition thus obtained into each of the depressed part of the lower mold for molding half shells, and applying pressure to mold half shells. Compression molding was conducted at the temperature of 170° C. for 5 minutes under the molding pressure of 2.94 MPa. The center obtained above was covered with two half shells in a concentric manner and the cover (thickness:0.5 mm) was molded by compression molding. Compression molding was performed at the temperature of 150° C. for 2 minutes under the molding pressure of 9.8 MPa to obtain a golf ball body.

(3) The surface of the obtained golf ball body was subjected to sandblast treatment and marking followed by coating a clear paint, drying at the temperature of 40 C.° for 4 hours in an oven to dry the paint to obtain a golf ball having a diameter of 42.7 mm and a weight of 45.4 g.

Figure 2:
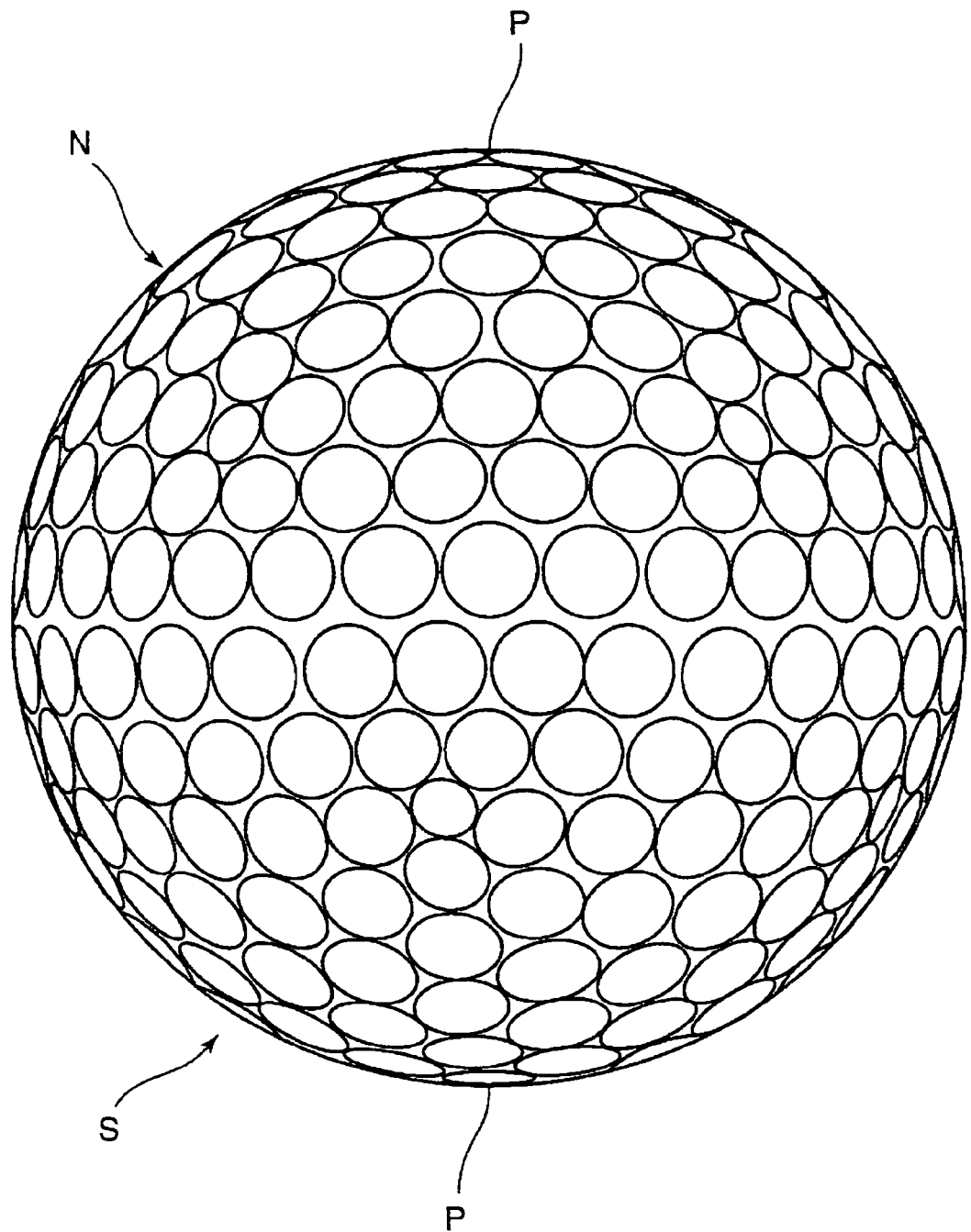
FIG. 2 is a front view of a dimple pattern formed on a golf ball surface.
Figure 3:
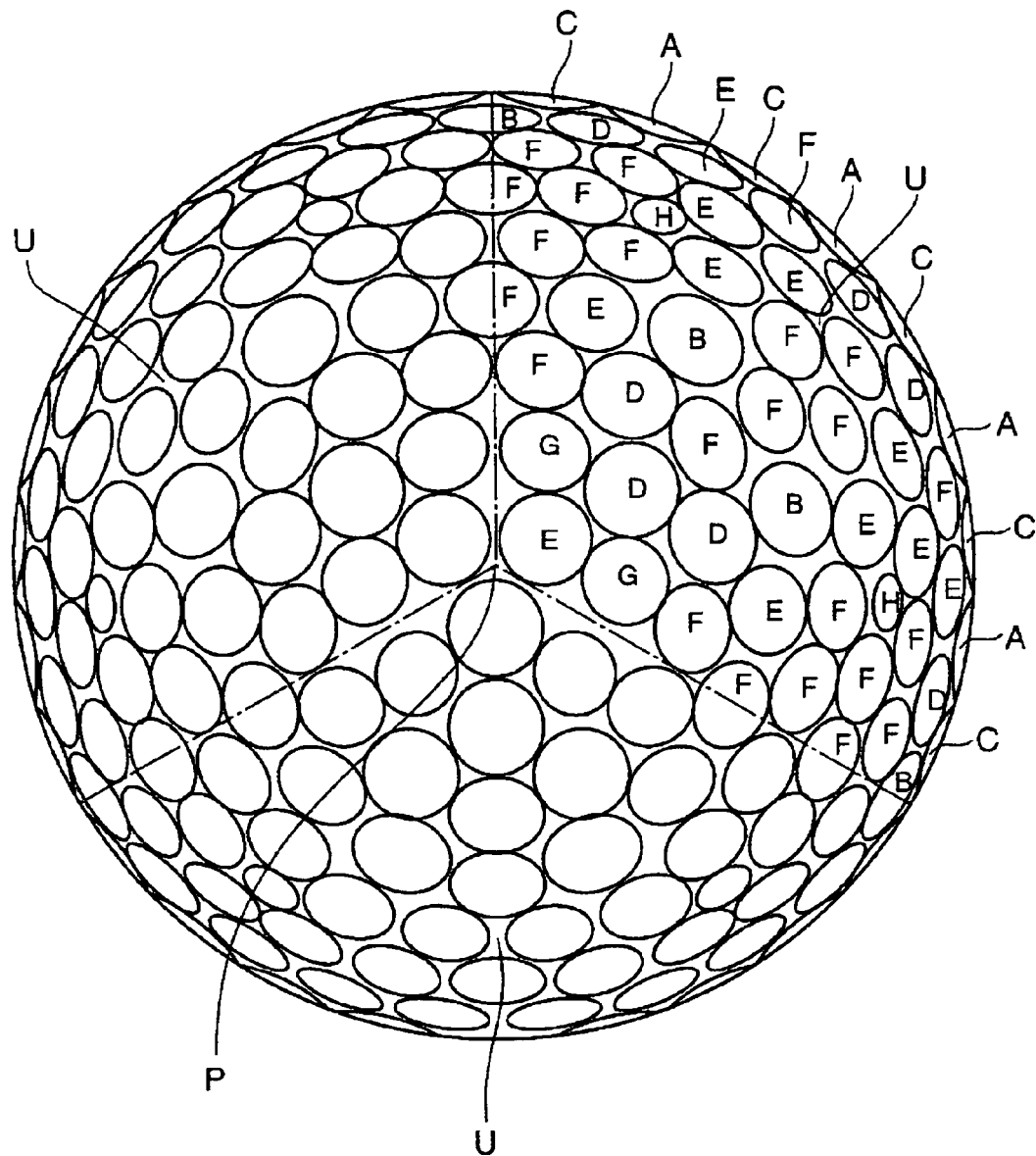
FIG. 3 is a plain view of a dimple pattern formed on a golf ball surface.

The dimple pattern shown in Table 4, FIG. 2 and FIG. 3 were formed on the surface of the golf ball. In the north hemisphere N and south hemisphere S of the golf ball, there is a unit U which has rotational symmetries through 120 degrees. In each of the north hemisphere N and the south hemisphere S, there are three units U. FIG. 3 shows kinds of dimples by represented symbols A to H in only one unit U.

TABLE 4

| Kinds | Number | Diameter (mm) | Depth (mm) | Curvature radius (mm) | Volume (mm$^3$) |
|---|---|---|---|---|---|
| A | 24 | 4.75 | 0.140 | 20.22 | 1.242 |
| B | 18 | 4.65 | 0.140 | 19.38 | 1.190 |
| C | 30 | 4.55 | 0.135 | 19.24 | 1.099 |
| D | 42 | 4.45 | 0.135 | 18.40 | 1.051 |
| E | 66 | 4.25 | 0.135 | 16.79 | 0.959 |
| F | 126 | 4.05 | 0.130 | 15.84 | 0.839 |
| G | 12 | 3.95 | 0.130 | 15.07 | 0.798 |
| H | 12 | 2.80 | 0.120 | 8.23 | 0.370 |

The obtained golf ball was evaluated in terms of the initial ball speed at the shot with the driver, spin rate, flight distance, abrasion-resistance and durability. The results are shown in Tables 5 and 6.

TABLE 5-1

|  |  | Golf ball | | | | | |
|---|---|---|---|---|---|---|---|
|  |  | 1 | 2 | 3 | 4 | 5 | 6 |
|  | Structure | 2P | 2P | 2P | 2P | 3P | 3P |
| Core | Diameter (mm) | 40.7 | 40.7 | 40.7 | 40.7 | 40.7 | 40.7 |
|  | Center hardness Ho | 35 | 35 | 35 | 35 | 35 | 35 |
|  | Surface hardness Hs | 55 | 55 | 55 | 55 | 55 | 55 |
|  | Hardness Difference | 20 | 20 | 20 | 20 | 20 | 20 |
|  | Intermediate Layer Thickness (mm) | — | — | — | — | 1.3 | 1.3 |
| Cover | Thermoplastic polyurethane (A) |  |  |  |  |  |  |
|  | Elastollan ET858D | — | — | — | — | — | — |
|  | Elastollan ET864D | 100 | 100 | 100 | 100 | 100 | 100 |
|  | Elastollan 1174D | — | — | — | — | — | — |
|  | Elastollan HM76D | — | — | — | — | — | — |
|  | Polyisocyanate mixture (B) [NCO %] |  |  |  |  |  |  |
|  | 1 [1.9] | 7.4 | — | — | — | — | — |
|  | 2 [0.7] | — | 20 | — | — | — | — |
|  | 3 [1.1] | — | — | 12.7 | — | — | — |
|  | 4 [0.4] | — | — | — | 35 | — | — |
|  | 5 [1.8] | — | — | — | — | 7.8 | — |
|  | 6 [0.7] | — | — | — | — | — | 20 |
|  | 7 [1.1] | — | — | — | — | — | — |
|  | 8 [0.4] | — | — | — | — | — | — |
|  | L.M. Polyisocyanate mixture [NCO %] |  |  |  |  |  |  |
|  | 1 [11.2] | — | — | — | — | — | — |
|  | 2 [11.0] | — | — | — | — | — | — |
|  | Titanium oxide | 4 | 4 | 4 | 4 | 4 | 4 |
|  | Slab hardness (Shore D) | 64 | 64 | 65 | 65 | 64 | 64 |
|  | Thickness (mm) | 1.0 | 1.0 | 1.0 | 1.0 | 1.0 | 1.0 |
|  | Cover formation | Inj. | Inj. | Inj. | Inj. | Inj. | Inj. |
| Property at Driver shot | Initial ball speed (m/s) | 65.5 | 65.5 | 65.5 | 65.5 | 65.5 | 65.5 |
|  | Launch angle (°) | 12.4 | 12.4 | 12.5 | 12.5 | 12.6 | 12.6 |
|  | Spin rate (rpm) | 2930 | 2950 | 2940 | 2910 | 2870 | 2880 |
|  | Flight distance (m) | 237.8 | 236.8 | 237.1 | 237.4 | 238.2 | 237.4 |
|  | Abrasion-resistance | G | G | G | G | E | E |
|  | Durability | 106 | 110 | 108 | 113 | 105 | 111 |

TABLE 5-2

|  |  | Golf ball | | | | |
|---|---|---|---|---|---|---|
|  |  | 7 | 8 | 9 | 10 | 11 |
|  | Structure | 3P | 3P | 2P | 2P | 2P |
| Core | Diameter (mm) | 40.7 | 40.7 | 40.7 | 40.7 | 40.7 |
|  | Center hardness Ho | 35 | 35 | 35 | 35 | 35 |
|  | Surface hardness Hs | 55 | 55 | 55 | 55 | 55 |
|  | Hardness Difference | 20 | 20 | 20 | 20 | 20 |
|  | Intermediate Layer Thickness (mm) | 1.3 | 1.3 | — | — | — |
| Cover | Thermoplastic polyurethane (A) |  |  |  |  |  |
|  | Elastollan ET858D | — | — | — | — | — |
|  | Elastollan ET864D | 100 | 100 | 100 | 100 | 100 |
|  | Elastollan 1174D | — | — | — | — | — |
|  | Elastollan HM76D | — | — | — | — | — |
|  | Polyisocyanate mixture (B) [NCO %] |  |  |  |  |  |
|  | 1 [1.9] | — | — | — | — | — |
|  | 2 [0.7] | — | — | — | — | — |
|  | 3 [1.1] | — | — | — | — | — |
|  | 4 [0.4] | — | — | — | — | — |
|  | 5 [1.8] | — | — | — | — | — |
|  | 6 [0.7] | — | — | — | — | — |
|  | 7 [1.1] | 12.7 | — | — | — | — |
|  | 8 [0.4] | — | 35 | — | — | — |
|  | L.M. Polyisocyanate mixture [NCO %] |  |  |  |  |  |
|  | 1 [11.2] | — | — | 1.3 | — | — |
|  | 2 [11.0] | — | — | — | 1.3 | — |
|  | Titanium oxide | 4 | 4 | 4 | 4 | 4 |
|  | Slab hardness (Shore D) | 65 | 65 | 65 | 65 | 65 |
|  | Thickness (mm) | 1.0 | 1.0 | 1.0 | 1.0 | 1.0 |
|  | Cover formation | Inj. | Inj. | Inj. | Inj. | Inj. |
| Property at Driver shot | Initial ball speed (m/s) | 65.5 | 65.5 | 65.5 | 65.5 | 65.5 |
|  | Launch angle (°) | 12.6 | 12.4 | 12.5 | 12.5 | 12.5 |
|  | Spin rate (rpm) | 2850 | 2880 | 2950 | 2960 | 2920 |
|  | Flight distance (m) | 238.5 | 237.6 | 237.3 | 236.7 | 237.1 |
|  | Abrasion-resistance | E | E | F | F | P |
|  | Durability | 107 | 112 | 99 | 100 | 72 |

TABLE 6

| | | Golf ball | | | | | | |
|---|---|---|---|---|---|---|---|---|
| | | 12 | 13 | 14 | 15 | 16 | 17 | 18 |
| Core | Structure | 2P | 2P | 2P | 2P | 2P | 2P | 2P |
| | Diameter (mm) | 40.7 | 41.7 | 41.9 | 39.1 | 37.2 | 40.7 | 40.7 |
| | Center hardness Ho | 35 | 35 | 35 | 35 | 35 | 35 | 35 |
| | Surface hardness Hs | 55 | 55 | 55 | 55 | 55 | 55 | 55 |
| | Hardness Difference | 20 | 20 | 20 | 20 | 20 | 20 | 20 |
| Cover | Thermoplastic PU (A) | — | — | — | — | — | — | — |
| | Elastollan ET858D | — | — | — | — | — | 100 | — |
| | Elastollan ET864D | — | 100 | 100 | 100 | 100 | — | — |
| | Elastollan 1174D | 100 | — | — | — | — | — | — |
| | Elastollan HM76D | — | — | — | — | — | — | 100 |
| | Polyisocyanate mixture (B) [NCO %] | | | | | | | |
| | 1 [1.9] | — | — | — | — | — | — | — |
| | 2 [0.7] | — | — | — | — | — | — | — |
| | 3 [1.1] | — | — | — | — | — | — | — |
| | 4 [0.4] | 35 | 35 | 35 | 35 | 35 | 35 | 35 |
| | 5 [1.8] | — | — | — | — | — | — | — |
| | 6 [0.7] | — | — | — | — | — | — | — |
| | 7 [1.1] | — | — | — | — | — | — | — |
| | 8 [0.4] | — | — | — | — | — | — | — |
| | Titanium oxide | 4 | 4 | 4 | 4 | 4 | 4 | 4 |
| | Slab hardness (Shore D) | 74 | 65 | 65 | 65 | 65 | 59 | 77 |
| | Thickness (mm) | 1.0 | 0.5 | 0.4 | 1.8 | 2.8 | 1.0 | 1.0 |
| | Cover formation | Inj. | Comp. | Comp. | Inj. | Inj. | Inj. | Inj. |
| Property at Driver shot | Initial ball speed (m/s) | 65.6 | 66.5 | 66.6 | 65.0 | 63.5 | 64.8 | 65.6 |
| | Launch angle (°) | 12.5 | 12.7 | 12.7 | 12.4 | 12.1 | 12.5 | 12.6 |
| | Spin rate (rpm) | 2850 | 2750 | 2740 | 3050 | 3350 | 3080 | 2860 |
| | Flight distance (m) | 239.0 | 245.0 | 245.4 | 233.2 | 222.5 | 229.8 | 238.9 |
| | Abrasion-resistance | G | G | G | G | G | G | F |
| | Durability | 110 | 107 | 102 | 120 | 116 | 111 | 102 |

Note on tables 5-1, 5-2 and 6 Formulation: mass part,
L. M. Polyisocyanate mixture: Low molecular weight polyisocyanate mixture
"Inj.": Injection molding, "Comp.": Compression molding
Center hardness, surface hardness: Shore D hardness Golf balls Nos. 1 to 8 and 12 to 15 are the cases where the cover is made from a cover composition containing, as a resin component, a thermoplastic polyurethane (A) and a polyisocyanate mixture (B) in which a urethane prepolymer (b-1) having at least two isocyanate groups is dispersed in a thermoplastic resin (b-2) which does not substantially react with the isocyanate group; and wherein the cover composition has a slab hardness of more than 60 and not more than 75 in Shore D hardness, and the cover has a thickness of 2.5 mm or less. Right after hitting the golf ball with a driver, the spin rate was small and the initial ball speed was high. Thus, the long flight distance was achieved for these golf balls. Further, it is found that they were excellent in the abrasion resistance and durability. With respect to golf ball No. 15 among them, since the cover was formed to be relatively thick, the flight distance tended to be slightly short.

Golf balls Nos. 9 and 10 had covers formed in a manner that the thermoplastic polyurethanes (A) were post-crosslinked with low molecular weight polyisocyanates and golf ball No. 11 was a case of using non-crosslinked thermoplastic polyurethane (A) for the cover material. It is found that all of these golf balls were inferior in the abrasion resistance as compared with golf balls Nos. 1 to 8 and 12 to 15. Particularly in the case of the golf ball No. 11 using non-crosslinked thermoplastic polyurethane (A), it is found that the durability was also very inferior. It is found that since the golf ball No. 16 had a cover thickness exceeding 2.5 mm, the golf ball was inferior in the repulsion property and the flight distance was shortened. The golf balls Nos. 17 and 18 were cases that the cover compositions had the slab hardness of 60 or lower and exceeding 75, respectively, in Shore D hardness, and it is found that since the slab hardness was 60 or lower, the golf ball No. 17 was inferior in the repulsion property and the flight distance was shortened and since the slab hardness exceeded 75, the golf ball No. 18 had lowered abrasion resistance.

The present invention can be applied to a golf ball and more particularly is preferable for improving the abrasion resistance, durability and the long flight distance for a golf ball having a urethane cover. This application is based on Japanese Patent application Nos. 2007-291125 filed on Nov. 8, 2007, the contents of which are hereby incorporated by reference.

What is claimed is:

1. A golf ball comprising a core and a cover covering the core,
wherein the cover is made from a cover composition containing, as a resin component,
a thermoplastic polyurethane (A) and
a polyisocyanate mixture (B) in which a urethane prepolymer (b-1) having at least two isocyanate groups is dispersed in a thermoplastic resin (b-2) which does not substantially react with an isocyanate group; and
wherein a number average molecular weight of a polyol component constituting the urethane prepolymer (b-1) is 650 or more, the polyisocyanate mixture (B) has NCO content (NCO %) of 0.1 mass % to 3.0 mass %, the cover composition has a slab hardness of more than 60 and not more than 75 in Shore D hardness, and
the cover has a thickness of 2.5 mm or less.

2. The golf ball according to claim 1, wherein the urethane prepolymer (b-1) is represented by the following formula (1)

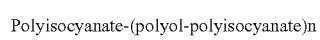

Polyisocyanate-(polyol-polyisocyanate)n    (1)

wherein the connecting number n denotes an integer of not less than 1 and not higher than 10.

3. The golf ball according to claim 1, wherein the thermoplastic resin (b-2) which does not substantially react with the isocyanate group is at least one kind selected from the group consisting of a polyester elastomer, an acrylic elastomer, a styrene elastomer, an olefin elastomer, and a vinyl chloride elastomer.

4. The golf ball according to claim 1, wherein the cover composition contains the polyisocyanate mixture (B) in an amount of 1 part to 50 parts by mass based on 100 parts by mass of the thermoplastic polyurethane (A).

5. The golf ball according to claim 1, wherein the urethane prepolymer (b-1) and the thermoplastic resin (b-2) are blended in the polyisocyanate mixture (B) (a total of 100 mass %) in a ratio of the urethane prepolymer (b-1)/the thermoplastic resin (b-2)=5 mass % to 50 mass %/50 mass % to 95 mass %.

6. The golf ball according to claim 1, wherein the urethane prepolymer (b-1) has a number average molecular weight of 1000 to 30000.

7. The golf ball according to claim 1, wherein the urethane prepolymer (b-1) is an isocyanate group terminated urethane prepolymer selected from the group consisting of 4,4'-diphenylmethane diisocyanate based urethane prepolymer, tolylene diisocyanate based urethane prepolymer, and 4,4'-dicyclohexylmethane diisocyanate based urethane prepolymer.

8. The golf ball according to claim 1, wherein the urethane prepolymer (b-1) has NCO content (NCO %) of 0.5 mass % to 15.0 mass %.

9. The golf ball according to claim 8, wherein the cover composition contains the polyisocyanate mixture (B) in an amount of 1 part to 50 parts by mass based on 100 parts by mass of the thermoplastic polyurethane (A).

10. The golf ball according to claim 9, wherein the urethane prepolymer (b-1) and the thermoplastic resin (b-2) are blended in the polyisocyanate mixture (B) (a total of 100 mass %) in a ratio of the urethane prepolymer (b-1)/the thermoplastic resin (b-2)=5 mass % to 50 mass %/50 mass % to 95 mass %.

11. The golf ball according to claim 10, wherein the thermoplastic resin (b-2) which does not substantially react with the isocyanate group is at least one kind selected from the group consisting of a polyester elastomer, an acrylic elastomer, a styrene elastomer, an olefin elastomer, and a vinyl chloride elastomer.

12. The golf ball according to claim 11, wherein the urethane prepolymer (b-1) is an isocyanate group terminated urethane prepolymer selected from the group consisting of 4,4'-diphenylmethane diisocyanate based urethane prepolymer, tolylene diisocyanate based urethane prepolymer, and 4,4'-dicyclohexylmethane diisocyanate based urethane prepolymer.

13. The golf ball according to claim 12, wherein the urethane prepolymer (b-1) has a number average molecular weight of 1000 to 30000.

* * * * *